March 8, 1960 D. K. DORRIS ET AL 2,927,682
DRIVE ASSEMBLY FOR A TROUGH CONVEYOR
Filed April 7, 1955
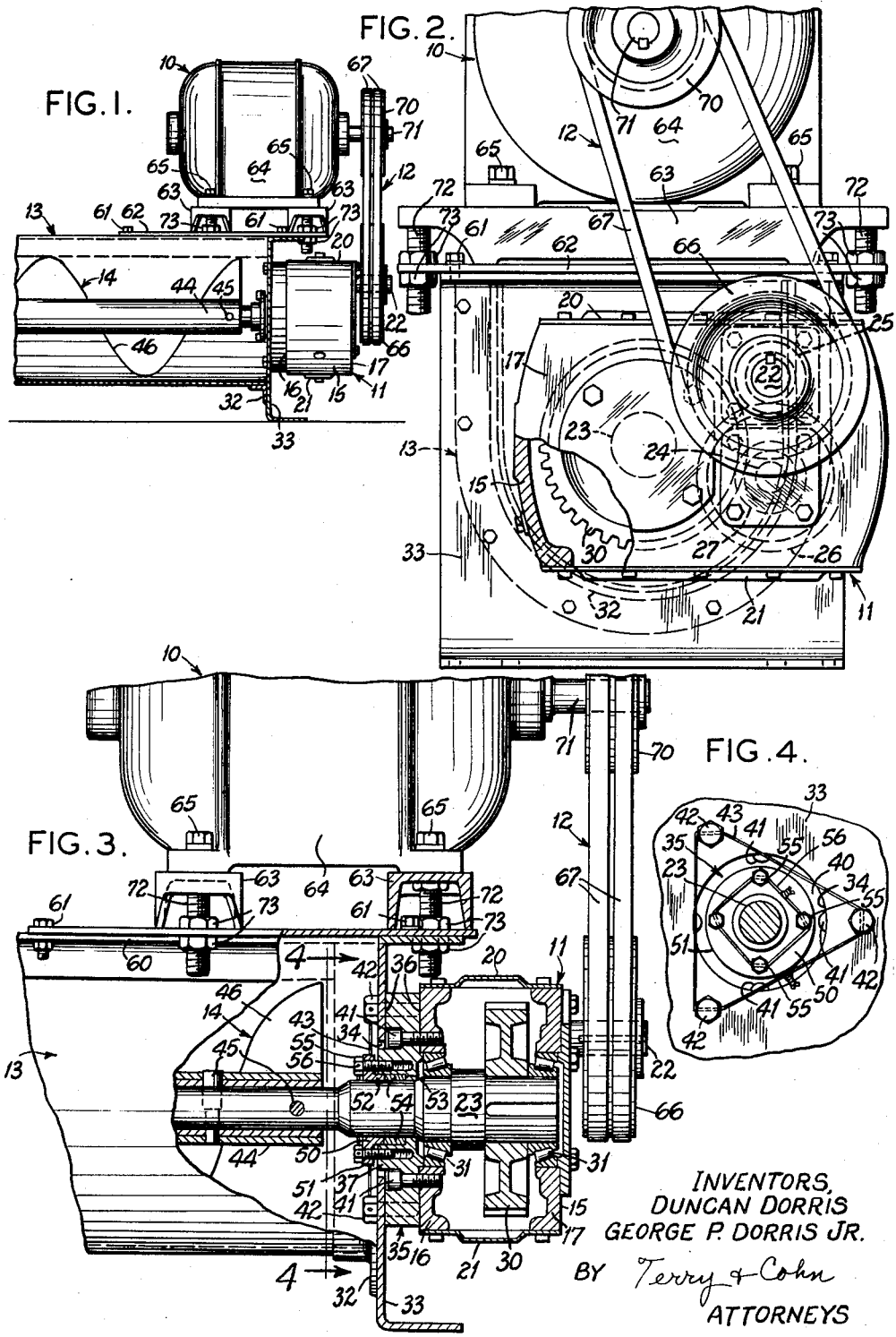
INVENTORS,
DUNCAN DORRIS
GEORGE P. DORRIS JR.
BY Terry & Cohn
ATTORNEYS

United States Patent Office 2,927,682
Patented Mar. 8, 1960

2,927,682

DRIVE ASSEMBLY FOR A TROUGH CONVEYOR

Duncan K. Dorris and George P. Dorris, Jr.,
Webster Groves, Mo.

Application April 7, 1955, Serial No. 499,774

4 Claims. (Cl. 198—213)

This invention relates to improvements in a drive assembly for a trough conveyor, and more particularly to an improved mounting of a speed reduction driving unit to the trough end of a screw conveyor, and to an improved mounting of a power means and its connection to such reduction unit.

An important objective of the present improvements is realized by the provision of an assembly for mounting and connecting a speed-reducing unit to a screw conveyor which eliminates the need for a separate drive shaft ordinarily connected with the conveyor screw, and eliminates the need for a thrust bearing on the end plate of the trough to journal the end of such conveyor screw. Heretofore, a front end bearing for the conveyor shaft is carried by the front end plate of a conveyor trough, and the reduction unit is mounted on an extension of the screw conveyor shaft so that the gear assembly is supported directly by that shaft.

Another highly important object of the invention is realized in the connection and mounting of a speed reducing unit to an adaptor ring that is detachably connectible to the end of the trough, the adaptor ring enabling any one of several different sizes of speed reducing units to fit a specified trough end for a certain size screw conveyor.

Still another important objective of the invention is realized in the mounting of a power means to the trough end, and the connection of such power means to a speed reducing unit, such mounting permitting selective adjustment of the position of the power means with respect to the gear reduction unit whereby to adjust the tension of a flexible driving means operatively interconnecting a shaft of the power means and an input shaft of said unit.

Another important object is realized by the structural arrangement of a ring-type packing gland which fits about an output, low speed shaft of the speed-reducing unit, and its connection to an adaptor ring utilized to mount such reduction unit, the gland preventing the material that is being conveyed in the trough from entering the speed-reducing unit, and likewise preventing the oil in the speed-reducing unit from contaminating the material that is being conveyed.

Of further advantage, the particular improved connection and mounting of the speed-reducing unit to the trough end enables the conveyor screw to be supported on bearings provided in the reduction unit to journal the output shaft. Thus, the need for a separate thrust bearing customarily mounted on the end plate of the trough is obviated.

It is an important object to realize an improved construction and structural arrangement that furnishes a compact, space-saving assembly of the power means, speed reduction unit and screw conveyor.

The foregoing and numerous other objects and advantages of the invention will more clearly appear from the following detailed description of a preferred embodiment, particularly when considered in connection with the accompanying drawing, in which:

Fig. 1 is a side elevational view, partly in cross section, showing the assembly of the motor, speed reduction unit, trough and conveyor screw;

Fig. 2 is an enlarged fragmentary end view of the conveyor assembly shown in Fig. 1;

Fig. 3 is a fragmentary view, partly in cross section and having cut away portions, showing the mounting of the speed reduction unit to the trough plate, and showing the mounting of the power means. The gears on the input and intermediate shafts of the reduction unit are omitted for the purpose of clearly illustrating the mounting of the output shaft, and Fig. 4 is a fragmentary view partly in cross section as seen along line 4—4 of Fig. 3.

Referring now by characters of refence to the drawing, and first to Fig. 1, it will be seen that motor 10 constituting the power means is operatively connected to a speed reduction unit referred to at 11 through a flexible drive means such as a belt-and-pulley arrangement indicated at 12. The reduction unit 11 is mounted on a trough generally designated at 13, the trough containing a screw feeding means shown at 14.

The reduction unit 11 includes a housing 15 having a front wall 16 and a spaced rear wall 17, more clearly shown in Fig. 3. An upper panel 20 and a lower panel 21 are each detachably secured to housing 15, the panels 20 and 21 bridging front and rear walls 16 and 17. These panels 20 and 21 may be conveniently removed for ready access to the internal gearing of reduction unit 11.

A high speed input shaft 22 and a low speed output shaft 23 are mounted internally on housing 15, and particularly on wall portions 16 and 17. The input shaft 22 is operatively connected by gearing to output shaft 23, such gearing including an intermediate shaft 24 (Fig. 2) mounted internally of housing 15. The two-stage stepdown gearing arrangement is best shown in Fig. 2, and includes a pinion gear 25 carried by input shaft 22 which enmeshes a larger gear 26 carried by intermediate shaft 24. A smaller gear 27 carried by intermediate shaft 24 engages a relatively large gear 30 keyed to output shaft 23. In Fig. 3, only gear 30 on output shaft 23 is shown so that the particular mounting of shaft 23 may be clearly illustrated.

Provided in housing 15 is a pair of thrust bearings 31, shown in Fig. 3, one of such bearings 31 being carried by front wall 16 and the other coacting bearing being carried by rear wall 17. These thrust bearings 31 serve to journal output shaft 23, and are relatively reversely arranged within housing 15 so as to take the thrust of output shaft 23 in either direction of its rotation.

Connected to end flange 32 formed on trough 13 is an end plate 33 which constitutes a closure. The end plate 33 is provided with a circular aperture 34 that opens into trough 13. An adaptor ring 35 is utilized to connect the housing 15 of reduction unit 11 to the end plate 33. The adaptor ring 35 is located over output shaft 23, and is arranged between housing 15 and end plate 33. The adaptor ring 35 includes opposite faces 36 that abut wall 16 of housing 11 and abut the front face of end plate 33. A circular shoulder 37 projects through aperture 34 formed in end plate 33.

A recessed formation 40 is formed in one side 36 of adaptor ring 35, the recessed formation 40 being arranged annularly about shoulder 37. Located in recessed formation 40 are a plurality of capscrews 41 constituting threaded members connecting the adaptor ring 35 to the front wall 16 of housing 15. In the preferred construction shown in Fig. 4, there are four such capscrews 41. It will be noted from Figs. 3 and 4 that the end plate 33 extends over recessed formation 40 and over the capscrews 41, thus preventing accidental loosening of such capscrews. A plurality of threaded fastening elements 42 fasten end plate 33 to adaptor ring 35. From Fig. 4, it is seen that fastening elements 42 are located equidistantly from the axis of output shaft 23, and that a locking wire 43 is passed through and operatively interconnects the fastening elements 42 to retain the elements 42 in position. By utilizing the same size aperture 34 and the same position of fastening elements 42 in various sizes of trough ends, any of many sizes of speed reducing units 11 may be adapted to any trough end.

The output shaft 23 extends outwardly of housing 15, extends freely through aperture 34 and end plate 33, and thence extends into the interior of trough 13. The inner end of output shaft 23 is reduced in diameter, and is received in the hollow end of conveyor shaft 44, the shaft 44 being arranged in coaxial alignment with output shaft 23. Transverse pins 45 are utilized to connect shafts 23 and 44. A screw impeller 46 is carried by shaft 44 and operates to convey material along trough 13.

The structural arrangement of a ring type packing gland which fits about the low speed output shaft 23 of reduction unit 11, and which prevents the material that is being conveyed from entering the speed reducing unit and likewise prevents the oil in the unit from contaminating the material being conveyed, is more clearly shown in Fig. 3. The ring-type packing gland consists of a collar 50 located about output shaft 23, the collar 50 including a peripheral flange 51 and an annular shank portion 52. A portion of adaptor ring 35 immediately adjacent output shaft 23 is recessed to provide an annular packing chamber 53 that is open at the trough side of ring 35 and is closed at the other side. Located in annular chamber 53 is a compressible packing material 54. The shank 52 of collar 50 normally closes the open side of packing chamber 53, and is movably positioned therein so as to engage packing material 54. A plurality of capscrews 55, there being four in number as shown in Fig. 4, secure peripheral flange 51 to shoulder 37 of adaptor ring 35. By adjusting cap screws 55, the collar 50 may be adjustably moved in a direction toward shoulder 37, whereby annular shank 52 engages and compresses packing material 54 in packing chamber 53 to provide a tight seal between adaptor ring 35 and output shaft 23. A locking wire 56 is passed through cap screws 55, and is twisted together so as to retain the cap screws in adjusted position.

Secured to the upper end of end plate 33 and to flange 60 of trough 13 by nut-and-bolt combination 61 is a base plate 62. A pair of rails 63 comprised of U-shaped channels are disposed transversely of base plate 62, the rails 63 constituting the supporting means for motor 64. The motor 64 is secured to rails 63 by bolts and nuts 65.

A flexible driving means operatively interconnects the motor 64 with input shaft 22. The input shaft 22 extends outwardly of housing 15, and is provided with a pulley 66. Belts 67 connect pulley 66 with a pulley 70 keyed to shaft 71 of motor 64.

From Figs. 2 and 3, it is seen that a plurality of adjustable jackscrews 72 are carried by base plate 62, the screws 72 extending upwardly through base plate 62 into engagement with the underside of rails 63. In the preferred arrangement, one such jackscrew 72 engages each end of each rail 63. Cooperating nuts 73 located on opposite sides of base plate 62 serve to retain jackscrews 72 in their adjusted position with respect to rails 63. By adjusting jackscrews 72 lengthwise, the supporting rails 63 can be raised or lowered, which in turn changes the position of motor 64. By raising rails 63 by means of jackscrews 72, the center distance between input shaft 22 and motor shaft 71 can be increased to effect tensioning adjustment of drive belt 67. Since rails 63 are utilized to support motor 64, any size motor frame may be adapted to any size conveyor trough.

Although the invention has been described by particularized reference to a single advanced embodiment of the present improvements, the detail of description should be understood as illustrative rather than limiting, inasmuch as numerous variants are possible within the full intended scope of the claims hereunto appended.

We claim as our invention:

1. In a conveyor drive assembly for a trough, an end plate closing one end of said trough, said end plate being provided with an aperture, a reduction unit including a housing, an input and an output shaft carried by said housing, the output shaft extending freely through said aperture and into said trough, thrust bearings in said housing for journalling said output shaft, gearing interconnecting said input and output shafts, an adaptor ring located about said output shaft, and arranged between said housing and said end plate, the adaptor ring having opposite sides abutting said housing and said end plate, a recessed formation formed in one side of said ring, threaded members received in said recessed formation, said threaded members fastening said ring to said housing, the end plate extending over said recessed formation, and over said threaded members, and a plurality of threaded fastening elements connecting the end plate to said adaptor ring, said fastening elements being arranged in a predetermined position with respect to said end plate and said adaptor ring, whereby to adapt said trough end to various sizes of reduction units.

2. In a conveyor drive assembly for a trough, an end plate on said trough, said end plate being provided with an aperture, a reduction unit including a housing, an input shaft and an output shaft carried by said housing, the output shaft extending freely through said aperture and into said trough, an adaptor ring located about said output shaft, said adaptor ring having opposite sides engaging said housing and said end plate, a recess formation formed in one side of said adaptor ring, threaded members received in said recess formation, said threaded members fastening said adaptor ring to said housing, the end plate extending over said recess formation to cover said threaded members, a plurality of threaded fastening elements connecting the end plate to said adaptor ring, said adaptor ring having an annular portion spaced from said output shaft to provide a packing chamber, packing material disposed in said chamber between said adaptor ring and said output shaft, a collar disposed over said output shaft, said collar having a portion adapted to engage said packing material, and a plurality of capscrews fastening said collar to said adaptor ring, said capscrews permitting slidable adjustment of said collar so as to compress said packing material in said chamber to provide a tight seal between said adaptor ring and said output shaft.

3. In a conveyor drive assembly for a trough, an end plate on said trough, said and plate being provided with an aperture, a reduction unit including a housing, an input and an output shaft carried by said housing, gearing interconnecting said input and output shafts, the output shaft extending freely through said aperture and into said trough, thrust bearings in said housing for journalling said output shaft, an adaptor ring located about said output shaft, said ring having opposite sides engaging said housing and said end plate, an annular recess formation formed in one side of said adaptor ring, a plurality of threaded members received in said recessed formation, said threaded members fastening said adaptor ring to said housing, the end plate extending over said recess formation and over said threaded members, a plurality of threaded fastening elements connecting said end plate to said adaptor ring, said fastening elements being located in a predetermined position with respect to said end plate and said adaptor ring so as to adapt said trough ends to various sizes of reduction units, a locking wire interconnecting said fastening elements to retain said elements in position, the adaptor ring including a shoulder projecting into said aperture, said adaptor ring being provided with an annular portion spaced from said output shaft to provide a packing chamber, said ring including a wall that closes one end of said chamber, said chamber opening from one side of said adaptor ring, packing material disposed in said chamber between said adaptor ring and said output shaft, a collar located about said output shaft, said collar including a peripheral flange and an annular shank, said shank normally extending into said packing chamber and engaging said packing material, a plurality of capscrews connecting said flange to said shoulder, said capscrews permitting movement of said collar along said output shaft incident to adjustment, the shank compressing said packing material in said packing chamber to provide a tight seal between said adaptor ring and said output shaft, and a locking wire interconnecting said capscrews so as to retain said capscrews in position.

4. In a conveyor drive assembly for a trough, an end plate closing one end of said trough, said end plate being provided with an aperture, a reduction unit including a housing, an output shaft carried by said housing, said output shaft extending through said aperture into said trough, an adaptor ring located about said output shaft and arranged between said housing and said end plate, said adaptor ring having opposite sides abutting said housing and said end plate, a recessed formation formed in one side of said ring, threaded members received in said recessed formation, said threaded members fastening said ring to said housing, the end plate extending over said recessed formation and over said threaded members to preclude access to said threaded members when assembled to said end plate, and a plurality of threaded fastening elements connecting said end plate to said adaptor ring, said fastening elements being arranged in a predetermined position with respect to said end plate and said adaptor ring, whereby to adapt said trough end for various sizes of reduction units.

References Cited in the file of this patent

UNITED STATES PATENTS

| 350,154 | Radford | Oct. 5, 1886 |
| 1,666,135 | Hall | Apr. 17, 1928 |
| 1,690,111 | Heston et al. | Nov. 6, 1928 |
| 1,962,581 | Carroll | June 12, 1934 |
| 2,208,757 | Fitch | July 23, 1940 |
| 2,266,945 | Abraham | Dec. 23, 1941 |

FOREIGN PATENTS

| 648,926 | Germany | Aug. 31, 1937 |